United States Patent [19]

Hiraguchi et al.

[11] Patent Number: 5,206,888
[45] Date of Patent: Apr. 27, 1993

[54] START-STOP SYNCHRONOUS COMMUNICATION SPEED DETECTING APPARATUS

[75] Inventors: Masayoshi Hiraguchi, Tokyo; Masanori Hattori, Shizuoka, both of Japan

[73] Assignee: NEC Corporation, Japan

[21] Appl. No.: 784,922

[22] Filed: Oct. 30, 1991

[30] Foreign Application Priority Data

Oct. 31, 1990 [JP] Japan ................... 2-291855

[51] Int. Cl.$^5$ ............................................. G04F 10/04
[52] U.S. Cl. .......................................... 377/20; 377/39; 364/569; 395/550
[58] Field of Search ................. 377/20, 54; 364/569; 395/550

[56] References Cited

U.S. PATENT DOCUMENTS

| | | | |
|---|---|---|---|
| 4,598,375 | 7/1986 | Hiramatsu et al. | 364/569 |
| 4,712,072 | 12/1987 | Kawanabe | 377/20 |
| 4,956,781 | 9/1990 | Calvird et al. | 377/20 |
| 5,010,560 | 4/1991 | Janney et al. | 364/569 |
| 5,077,763 | 12/1991 | Gagnoud et al. | 377/20 |

*Primary Examiner*—John S. Heyman
*Attorney, Agent, or Firm*—Ostrolenk, Faber, Gerb & Soffen

[57] ABSTRACT

A start-stop synchronous communication speed detecting apparatus includes a counter, a speed determining unit, a clock switching unit, a shift register, a character determining unit, a code generator, and a controller. The counter counts a time period, in which received data is a space polarity, in start-stop synchronous communication. The speed determining unit compares the count value with a time per bit of a specified communication speed. The clock switching unit selects a clock synchronized with the start bit of the received data and having the same frequency as that of the specified communication speed. The shift register stores the received data. The character determining unit compares a received character from the register with a predetermined character. The code generator supplies codes of the first to Nth characters to the character determining unit. The controller counts received characters by the output clocks from the switching unit and informs the generator of the number of characters, generates a reception completion information signal upon receiving a predetermined character string without any abnormality, and outputs a signal for initializing the counter by a signal indicating abnormality in the speed and character determining units.

7 Claims, 4 Drawing Sheets

FIG.3A RECEIVED DATA 41

FIG.3B CLOCK 50a

FIG.3C CLOCK 50b

FIG.3D CLOCK 50c

FIG.3E SAMPLING CLOCK 51

FIG.3F ONE-CHARACTER RECEPTION SIGNAL 54

FIG.3G RECEIVED CHARACTER COUNT 55

FIG.3H CHARACTER INCOMPATIBILITY SIGNAL 58

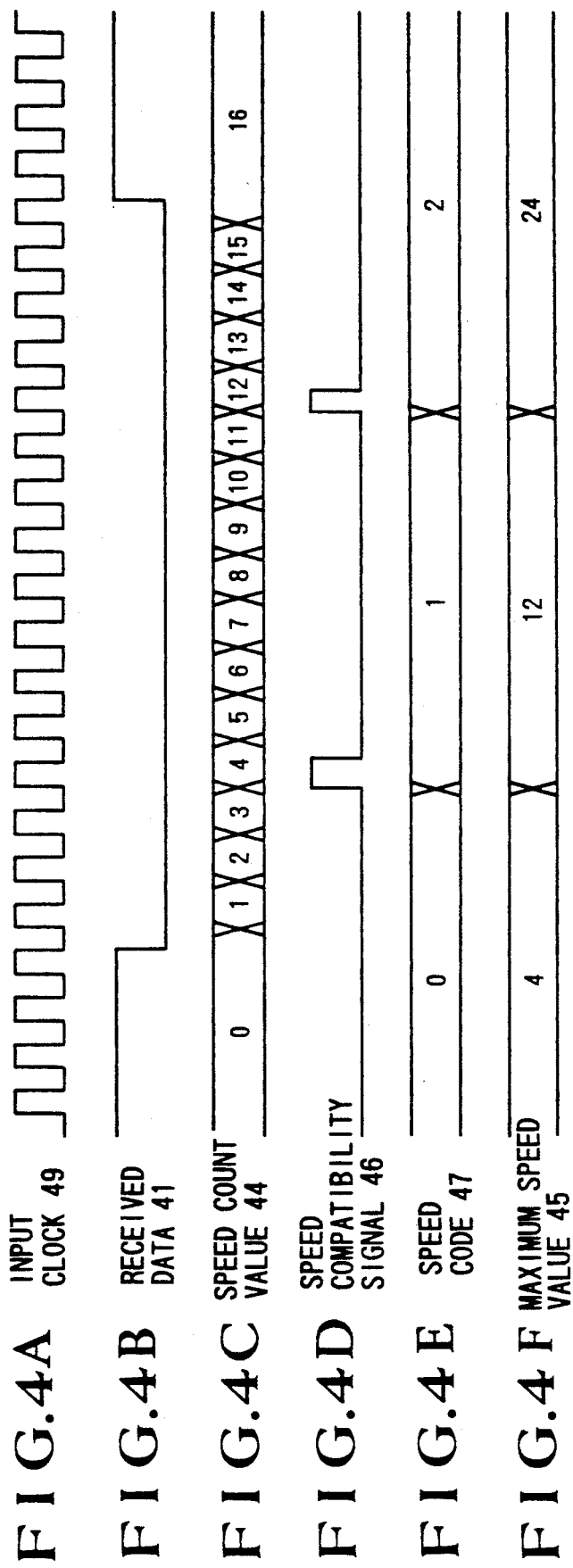

START-STOP SYNCHRONOUS COMMUNICATION SPEED DETECTING APPARATUS

BACKGROUND OF THE INVENTION

The present invention relates to a start-stop synchronous communication speed detecting apparatus used to, for example, detect a communication speed between a data terminal equipment (to be referred to as a DTE hereinafter), which is used in a data circuit terminating equipment (to be referred to as a DCE hereinafter), and the DCE.

In data communication using a DCE, a SET command is sometimes set as an extension command of a CCITT recommendation V. 25 bis "serial automatic calling protocol". In asynchronous communication, therefore, the DCE automatically detects a communication speed by receiving a "SET CR" (CR: carriage return) of IA5 characters from a DTE and performs reception of commands and transmission of indications with respect to the DTE in accordance with the detected speed. Therefore, the DCE requires detection of the communication speed by the "SET CR" received from the DTE.

In conventional start-stop synchronous communication speed detecting apparatuses of this type, a detection signal indicating the start of space polarity is generated, and a central processing unit (to be referred to as a CPU hereinafter) detects this detection signal and starts a timer. When a detection signal indicating the end of the space polarity is generated, the CPU stops the timer and calculates a communication speed by software in accordance with the timer value. The CPU controls a serial interface LSI to enable reception of characters subsequent to the space polarity and fetches the received characters. After checking whether the fetched characters constitute a character string for communication speed automatic detection, the CPU controls the serial interface LSI again.

In the above conventional start-stop synchronous communication speed detecting apparatus, however, since software dependency is high, software for processing occupies the CPU at the start and end of the space polarity and at the time of character reception. Therefore, an operating ratio in other operations to be executed by the CPU is reduced. In addition, when the communication speed is increased, control of the serial interface LSI performed at the end of the space polarity sometimes lags behind reception of characters subsequent to the space polarity.

SUMMARY OF THE INVENTION

It is an object of the present invention to provide a start-stop synchronous communication speed detecting apparatus capable of detecting a communication speed without performing any software processing, thereby increasing an operating ratio in other operations of a CPU.

It is another object of the present invention to provide a start-stop synchronous communication speed detecting apparatus capable of detecting a communication speed even if the communication speed is high.

In order to achieve the above objects of the present invention, there is provided a start-stop synchronous communication speed detecting apparatus comprising a counter for counting a time period, in which received data is a space polarity, in start-stop synchronous communication, speed determining means for comparing the count value with a time per bit of a specified communication speed, clock switching means for selecting a clock synchronized with the start bit of the received data and having the same frequency as that of the specified communication speed, a shift register for storing the received data, character determining means for comparing a received character from the shift register with a predetermined character, code generating means for supplying codes of the first to Nth characters to the character determining means, and a controller for counting received characters by the output clocks from the clock switching means and informing the code generating means of the number of characters, generating a reception completion information signal upon receiving a predetermined character string without any abnormality, and outputting a signal for initializing the counter by a signal indicating abnormality in the speed determining means and the character determining means.

BRIEF DESCRIPTION OF THE DRAWINGS

FIGS. 3A to 3H are timing charts for explaining the operation of the embodiment shown in FIG. 2; and FIGS. 4A to 4F are timing charts showing a portion indicated by A in FIG. 3A in detail.

DETAILED DESCRIPTION OF THE PREFERRED EMBODIMENT

An embodiment of the present invention will be described in detail below with reference to the accompanying drawings.

Figure 1:
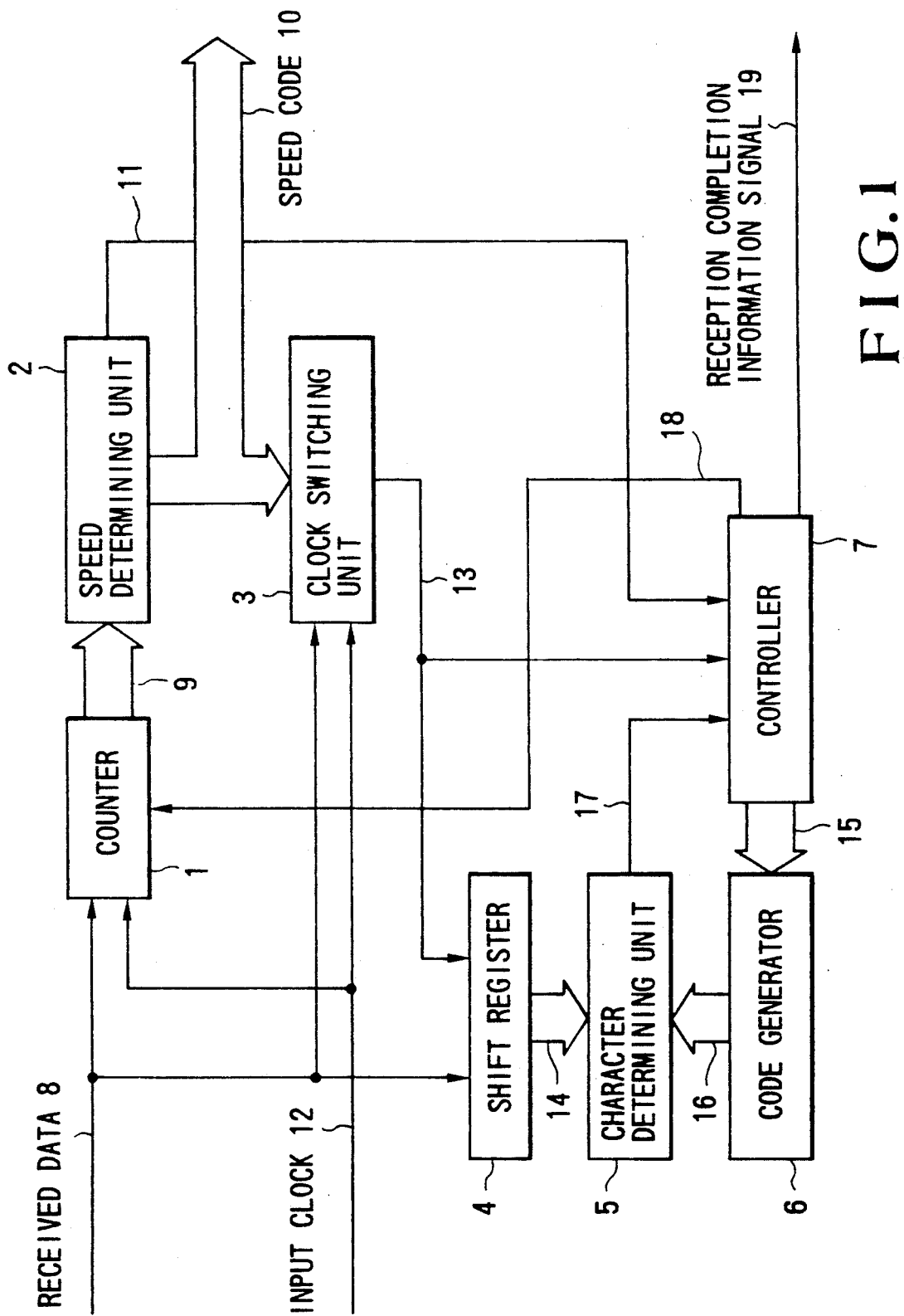
FIG. 1 is a block diagram showing the principle of the present invention.

FIG. 1 shows blocks for explaining the principle of the present invention.

Referring to FIG. 1, reference numeral 1 denotes a counter for counting a time period in which received data 8 is a space polarity; and 2, a speed determinating unit for comparing the time per bit of a specified communication speed with a speed count value 9 of the counter 1. If the comparison result falls within a compatible range, the speed determining unit 2 outputs a speed code 10 indicating the specified communication speed that the value applies to. If the comparison result falls outside the compatible range, the speed determining unit 2 outputs a speed incompatibility signal 11 indicating abnormality to a controller 7 (to be described later). Reference numeral 3 denotes a clock switching unit for generating a clock synchronized with the start bit of the received data 8 and having the same frequency as that of each specified communication speed in accordance with an input clock 12, and selectively outputting a sampling clock 13 corresponding to the specified communication speed, to which the speed count value 9 applies, to a shift register 4 (to be described below) and the controller 7.

Reference numeral 4 denotes a shift register for storing the received data 8 of one character in synchronism with the sampling clock 13; and 5, a character determining unit for comparing a received character 14 with a predetermined character code 16. If noncoincidence is determined, the character determining unit 5 outputs a character incompatibility signal 17 indicating abnormality. Reference numeral 6 denotes a code generator for supplying character codes 16 of the first to Nth characters predetermined in the character determining unit 5.

Reference numeral 7 denotes a controller for counting a received character count 15 in accordance with the sampling clock 13 and monitoring the character incompatibility signal 17 from the character determining unit 5 upon receiving each character. If abnormality is detected, the controller 7 performs initialization and also initializes the counter 1 by an initialization request signal 18. If no abnormality is detected, the controller 7 informs the code generator 6 of the received character count 15 in order to generate a character code to be received next. Upon receiving a predetermined character string without any abnormality, the controller 7 generates a reception completion information signal 19.

Figure 2:
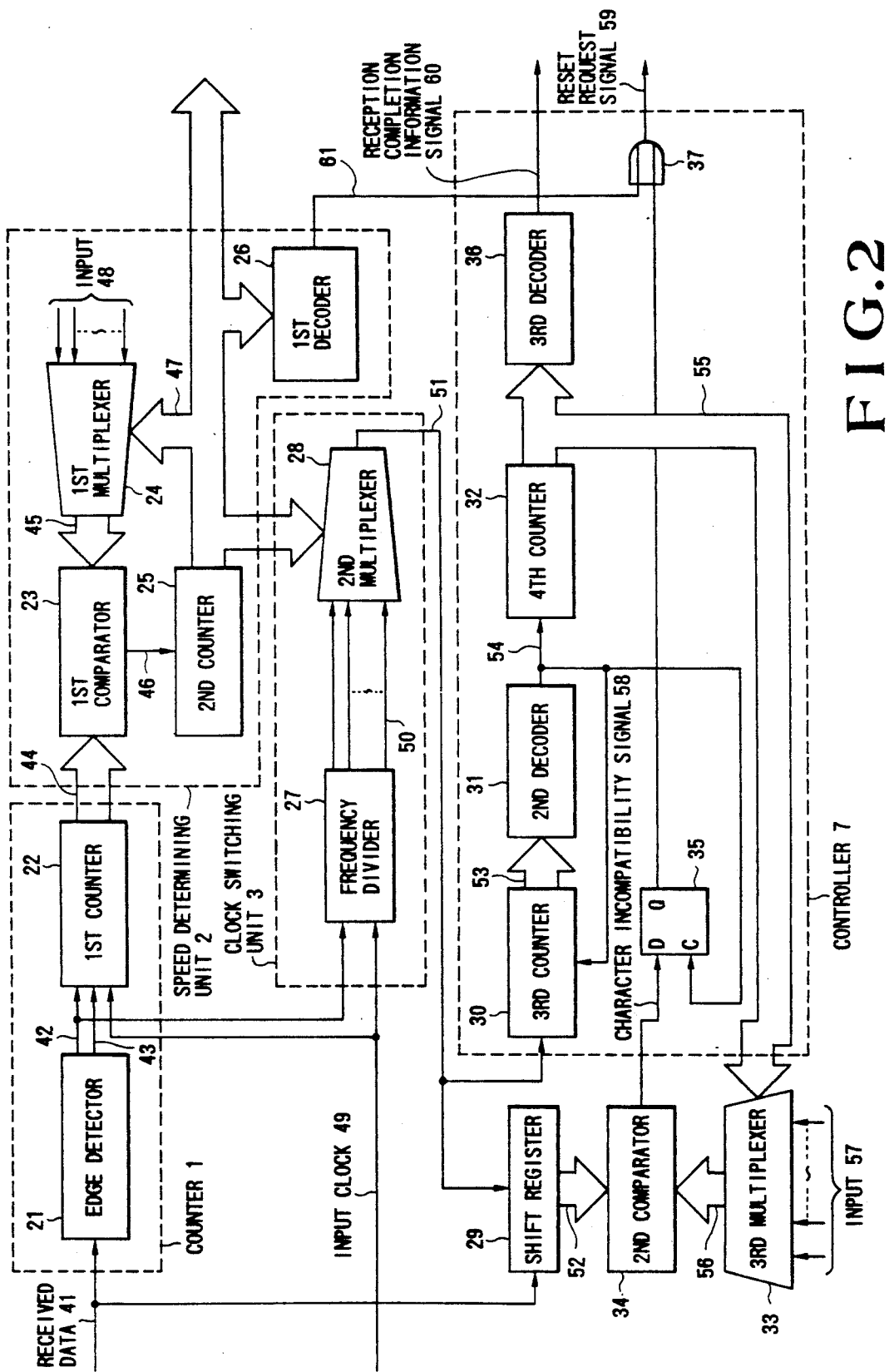
FIG. 2 is a block diagram showing an embodiment of the present invention.

FIG. 2 shows blocks of an embodiment of the present invention, in which portions corresponding to those in FIG. 1 are indicated by dotted lines. FIGS. 3A to 3H explain the operation of the embodiment shown in FIG. 2, and FIGS. 4A to 4F show a portion indicated by reference symbol A in FIG. 3A in detail.

An edge detector 21 monitors received data 41 shown in FIG. 3A. The edge detector 21 outputs a trailing-edge detection signal 42 upon detecting the trailing edge of the received data 41 and a leading-edge detection signal 43 upon detecting its leading edge.

A counter 22 performs count-up in accordance with an input clock 49 and outputs a speed count value 44 once after initialization when the trailing-edge detection signal 42 is valid and the leading-edge detection signal 43 is invalid (see FIG. 4C).

Assume that specified communication speeds of this embodiment are, from a higher one, speeds A, B, and C [bps], and that values obtained by dividing the shortest transmission times per bit, which are to be determined as the speeds A, B, and C in accordance with the received data 41, by the frequency of the input clock 49, are 4, 12, and 24, respectively, and are called maximum speed values of the respective speeds. In addition, assume that values of speed codes representing the speeds A, B, and C are 1, 2, and 3, respectively.

A first multiplexer 24 presets an input 48 so that a maximum speed value 45 of a specified communication speed lower by one step than a speed indicated by a speed code 47 is selected by the speed code 47 (see FIG. 4F). If the speed count value 44 coincides with the maximum speed value 45 of the specified communication speed, a first comparator 23 validates a speed compatibility signal 46. A second counter 25 performs count-up in accordance with the speed compatibility signal 46 and outputs the speed code 47 (see FIG. 4E). If the speed code exceeds 3, the first decoder 26 validates a speed incompatibility signal 61 in order to initialize each block.

A frequency divider 27 frequency-divides the clock 49 to obtain clocks 50 having the same frequency as that of the specified speed in synchronism with the trailing-edge detection signal 42. Assuming that the speed of received data to be detected is B [bps], clocks A, B, and C [Hz] shown in FIGS. 3B, 3C, and 3D, respectively, are present in the clocks 50. A second multiplexer 28 selects a clock corresponding to the speed code 47 and outputs it as a sampling clock 51 of the received data (see FIG. 3E).

Counting of the input clock 49 shown in FIG. 4A is started in accordance with the received data 41 shown in FIG. 4B, and the speed count value 44 shown in FIG. 4C is counted up. The maximum speed value 45 shown in FIG. 4F is 4 because of an initial value 0 of the speed code 47 shown in FIG. 4E. When the speed count value 44 shown in FIG. 4C is counted up to be four, the speed compatibility signal 46 shown in FIG. 4D becomes valid, and the speed code 47 shown in FIG. 4E is counted up by one to be 1. In addition, the maximum speed value 45 shown in FIG. 4F becomes 12 in accordance with the speed code 47 shown in FIG. 4E. Similarly, when the speed count value shown in FIG. 4C is counted up to be 12, the speed code 47 shown in FIG. 4E becomes 2. Thereafter, the speed code 47 shown in FIG. 4E remains 2 because the speed count value 44 shown in FIG. 4C is less than 24. Therefore, the second multiplexer 28 selects and outputs the clock 50b as the sampling clock 51 shown in FIG. 3E.

A shift register 29 (corresponding to the shift register 4 in FIG. 1) has flip-flops equal in number to a character length. The shift register 29 samples the received data 41 and outputs parallel received data 52.

A third counter 30 counts the sampling clock 51. When a count value 53 of the third counter 30 becomes equal to the character length, a second decoder 31 validates a one-character end signal 54 (see FIG. 3F). A fourth counter 32 counts the character reception signal 54 from the second decoder 31 and outputs a received character count 55 (see FIG. 3G).

An expected value of a received character string is set beforehand by setting of a third multiplexer 33 (corresponding to the code generator 6 in FIG. 1) to an input 57. The third multiplexer 33 outputs a character code 56 to be received next in accordance with the value indicated by the received character count 55. If the parallel received data 52 from the shift register 52 coincides with the character code 56, a second comparator 34 (corresponding to the character determining unit 5 in FIG. 1) invalidates a character incompatibility signal 58 (see FIG. 3H). The character incompatibility signal 58 is sampled by a flip-flop 35 immediately after reception of one character is finished, and is ORed with the speed incompatibility signal 61 from the first decoder 26 by a gate 37. The OR output is supplied as a reset request signal 59 to the reset input terminal of each block. When a character is received without any abnormality, the received character count 55 is incremented. When reception of a predetermined character string is finished, a third decoder 36 validates the reception completion information signal 60. The speed code 47 obtained upon validation of the reception completion information signal 60 represents the detected speed.

According to the present invention as has been described above, in start-stop synchronous communication, a circuit having a counter, a speed determining means, a clock switching means, a shift register, a character determining means, a code generating means, and a controller executes detection of a communication speed and confirmation of a received character as well in accordance with received data. Therefore, since no software is necessary, it is possible to detect a communication speed even if the communication speed is high.

What is claimed is:

1. A start-stop synchronous communication speed detecting apparatus comprising:
   a counter for counting a time period, in which received data is a space polarity, in start-stop synchronous communication;
   speed determining means for comparing the count value with a time per bit of a specified communication speed;

clock switching means for selecting a clock synchronized with a start bit of the received data and having the same frequency as that of the specified communication speed;

a shift register for storing the received data;

character determining means for comparing a received character from said shift register with a predetermined character;

code generating means for supplying codes of first to Nth characters to said character determining means; and a controller for counting received characters by the output clocks from said clock switching means and informing said code generating means of the number of characters, generating a reception completion information signal upon receiving a predetermined character string without any abnormality, and outputting a signal for initializing said counter by a signal indicating abnormality in said speed determining means and said character determining means.

2. An apparatus according to claim 1, further comprising, in a front stage of said counter, an edge detector for outputting a trailing-edge detection signal upon detecting a trailing edge of the received data and a leading-edge detection signal upon detecting a leading edge thereof.

3. An apparatus according to claim 1, wherein said speed determining means comprises a first comparator for validating a speed compatibility signal when the speed count value coincides with a maximum speed value of the specified communication speed, a second counter for performing count-up in accordance with the speed compatibility signal to output a speed code, and a first decoder for validating a speed incompatibility signal when the speed code exceeds a specified value.

4. An apparatus according to claim 3, further comprising a first multiplexer for presetting an input so that a maximum speed value of a specified communication speed lower by one step than a speed indicated by the speed code is selected and output to said first comparator.

5. An apparatus according to claim 1, wherein said clock switching unit comprises a frequency divider for frequency-dividing a clock into clocks having the same frequency as that of the specified communication speed in synchronism with the trailing-edge detection signal, and a second multiplexer for selecting a clock corresponding to the speed code and outputting the selected clock as a sampling clock of received data.

6. An apparatus according to claim 1, wherein said controller comprises a third counter for counting the sampling clocks, a second decoder for validating a one-character end signal when the count value becomes equal to a character length, a fourth counter for counting the one-character end signals to output a received character count signal, a flip-flop for sampling a character incompatibility signal immediately after reception of one character is finished, a gate for ORing an output signal from said flip-flop with the speed incompatibility signal to output a reset request signal to a reset input terminal of each block, and a third decoder for validating the reception completion information signal upon receiving a predetermined character string.

7. An apparatus according to claim 6, further comprising a gate for ORing the output from said flip-flop with the speed incompatibility signal from said speed determining means to output a reset request signal.

* * * * *